(12) United States Patent
Ando

(10) Patent No.: US 12,172,640 B2
(45) Date of Patent: Dec. 24, 2024

(54) VEHICLE CONTROL APPARATUS

(71) Applicant: SUBARU CORPORATION, Tokyo (JP)

(72) Inventor: Yusuke Ando, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 196 days.

(21) Appl. No.: 18/075,593

(22) Filed: Dec. 6, 2022

(65) Prior Publication Data

US 2023/0182738 A1   Jun. 15, 2023

(30) Foreign Application Priority Data

Dec. 14, 2021 (JP) ................. 2021-202550

(51) Int. Cl.
| | |
|---|---|
| *B60W 30/08* | (2012.01) |
| *B60W 10/188* | (2012.01) |
| *B60W 30/085* | (2012.01) |
| *B60W 30/18* | (2012.01) |
| *B60W 40/02* | (2006.01) |
| *B60W 40/08* | (2012.01) |

(52) U.S. Cl.
CPC ........ *B60W 30/181* (2013.01); *B60W 10/188* (2013.01); *B60W 30/08* (2013.01); *B60W 30/085* (2013.01); *B60W 30/18109* (2013.01); *B60W 40/02* (2013.01); *B60W 40/08* (2013.01); *B60W 2030/082* (2013.01); *B60W 2040/0818* (2013.01); *B60W 2710/18* (2013.01)

(58) Field of Classification Search
CPC ............... B60W 30/08; B60W 30/188; B60W 30/18109; B60W 40/02; B60W 2030/082; B60W 2030/085; B60W 2040/0818; B60W 2710/18
USPC .......................................................... 701/70
See application file for complete search history.

(56) References Cited

U.S. PATENT DOCUMENTS

| | | | | | |
|---|---|---|---|---|---|
| 3,871,475 | A | * | 3/1975 | Stevenson | ............... B60T 17/16 |
| | | | | | 292/144 |
| 4,834,207 | A | * | 5/1989 | Havenhill | ............... B60R 25/08 |
| | | | | | 180/289 |
| 5,528,216 | A | * | 6/1996 | Main | ....................... B60R 25/08 |
| | | | | | 340/426.33 |
| 5,570,756 | A | * | 11/1996 | Hatcher | .................. B60R 25/08 |
| | | | | | 303/53 |

(Continued)

FOREIGN PATENT DOCUMENTS

| | | |
|---|---|---|
| JP | 8-135494 A | 5/1996 |
| JP | 2006-44398 A | 2/2006 |

*Primary Examiner* — Erick R Solis
(74) *Attorney, Agent, or Firm* — TROUTMAN PEPPER HAMILTON SANDERS LLP

(57) ABSTRACT

A vehicle control apparatus in a vehicle that includes left wheels, right wheels and brake mechanisms each provided for both. The apparatus includes one or more processors and one or more storage media storing a program causing a brake control process in which brake fluid pressure is applied to the brake mechanisms of one-side wheels, either left or right wheels, to bring the one-side wheels to a locked state under the condition including that the vehicle is in a stopped state or in a substantially stopped state through driver emergency control that is to be applied to the vehicle in response to detection of emergency of a driver who drives the vehicle.

16 Claims, 9 Drawing Sheets

(56) References Cited

U.S. PATENT DOCUMENTS

| | | | | |
|---|---|---|---|---|
| 5,595,258 | A | * | 1/1997 | Georgas ................. B60R 25/08 188/353 |
| 2006/0028060 | A1 | | 2/2006 | Kuramochi et al. |
| 2008/0157942 | A1 | * | 7/2008 | Payne ................... B60R 25/102 340/426.12 |
| 2013/0342343 | A1 | * | 12/2013 | Harring ................ G09B 29/102 340/521 |
| 2014/0152422 | A1 | * | 6/2014 | Breed .................... B60R 25/08 340/5.52 |
| 2021/0170989 | A1 | * | 6/2021 | Cameron ............ B60R 25/1004 |
| 2023/0182681 | A1 | * | 6/2023 | Ando ....................... B60T 1/10 701/70 |

* cited by examiner

VEHICLE CONTROL APPARATUS

CROSS-REFERENCE TO RELATED APPLICATION

The present application claims priority from Japanese Patent Application No. 2021-202550 filed on Dec. 14, 2021, the entire contents of which are hereby incorporated by reference.

BACKGROUND

The disclosure relates to a vehicle control apparatus provided in a vehicle that has left and right wheels each having a brake mechanism. In particular, the disclosure relates to a technique to achieve vehicle theft prevention and securement of portability of a vehicle to a safety place when the vehicle is in a stopped state through driver emergency control, which is vehicle control in response to detection of emergency of a driver who drives the vehicle.

Japanese Unexamined Patent Application Publication (JP-A) No. 2006-044398 discloses a brake control technique to lock all wheels (or one or more wheels) in response to detection of theft of a vehicle.

JP-A No. H8-135494 discloses a control technique to upset the amount of incoming air and the amount of fuel injection in response to an accelerator operation so as to make it difficult to drive a vehicle in key mismatching (theft).

SUMMARY

According to an aspect of the disclosure, a vehicle control apparatus in a vehicle that includes left wheels at a left side, right wheels at a right side and brake mechanisms each provided in the left wheels and the right wheels. The vehicle control apparatus includes one or more processors and one or more storage media. The one or more storage media stores a program to be executed by the one or more processors. The program comprises one or more instructions. The one or more instructions cause the one or more processors to perform a brake control process in which brake fluid pressure is applied to the brake mechanisms of one-side wheels that are either the left wheels or the right wheels to bring the one-side wheels to a locked state under a condition including that the vehicle is in a stopped state or in a substantially stopped state through driver emergency control. The driver emergency control is to be applied to the vehicle in response to detection of emergency of a driver who drives the vehicle.

DETAILED DESCRIPTION

Some vehicles as automobiles perform driver emergency control, such as minimal risk maneuver (MRM), in recent years. The driver emergency control is vehicle control in response to detection of emergency of a driver who drives a vehicle, for example, is control to decelerate the vehicle to a stopped state. In the driver emergency control, a vehicle is stopped at a certain refuge place, such as a side strip of a straight track, in response to detection of emergency of the driver. In addition, in the driver emergency control, for example, control to notify the circumference of emergency of the driver by beeping a horn or the like is also performed.

After the vehicle is stopped as the result of the driver emergency control and the driver is rescued, the vehicle is left in the stopped state. Since such a state causes an obstacle on the road for other vehicles, the stopped vehicle is to be immediately delivered to a safety place.

In addition, since vehicle theft may occur when the stopped vehicle is left, any theft prevention control is to be performed.

In such a case, if control is performed to give priority to the theft prevention and to completely disable the driving by, for example, locking all the wheels, the portability of the vehicle to a safety place is impaired. In contrast, if control is performed to give priority to the portability of the vehicle to a safety place and to keep the vehicle in a drivable state, the risk of the theft is increased. It is difficult to achieve both the theft prevention and the securement of the portability to a safety place for the vehicle that has been stopped through the driver emergency control.

It is desirable to achieve both the vehicle theft prevention and the securement of the portability of the vehicle to a safety place after the vehicle is stopped through the driver emergency control.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
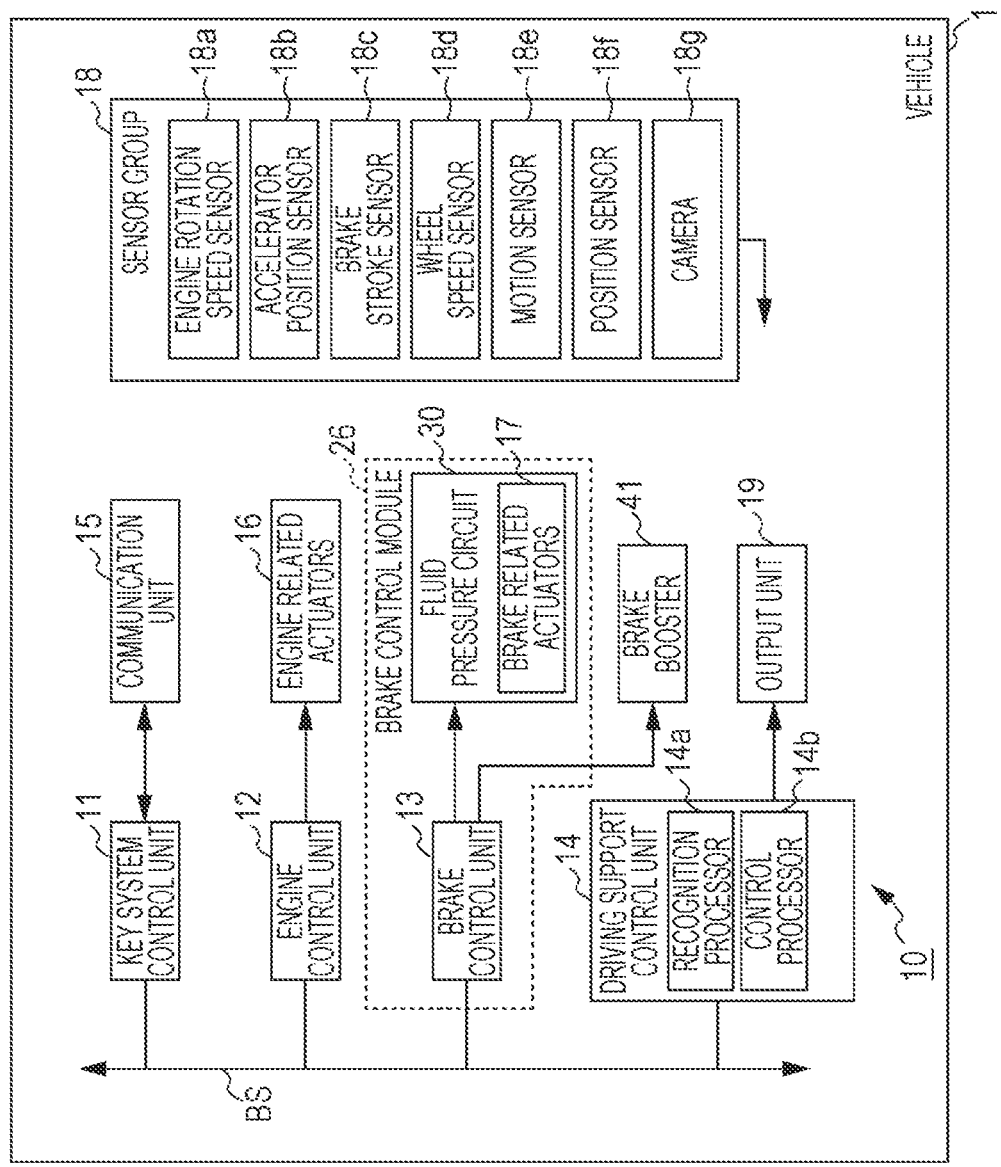
FIG. 1 is a block diagram schematically illustrating the configuration of a vehicle control apparatus according to an embodiment.

FIG. 1 is a block diagram schematically illustrating the configuration of a vehicle control apparatus 10 according to an embodiment of the disclosure.

The vehicle control apparatus 10 is provided in a vehicle 1. The vehicle 1 is, for example, a four-wheel automobile, which is an engine car having an engine as a driving source of the wheels, in the present embodiment. In the following description, among the four wheels of the vehicle 1, the front wheels are represented as wheels 2 and the rear wheels are represented as wheels 3. When the left and right wheels are to be discriminated, the right front wheel is denoted by a wheel 2R, the left front wheel is denoted by a wheel 2L, the right rear wheel is denoted by a wheel 3R, and the left rear wheel is denoted by a wheel 3L.

The vehicle 1 includes a brake mechanism 20 for each wheel although the brake mechanisms 20 are not illustrated in FIG. 1. The configuration of the brake mechanisms 20, a fluid pressure circuit 30 for driving the brake mechanisms 20, and so on in the vehicle 1 will be described in detail below.

As illustrated in FIG. 1, the vehicle control apparatus 10 includes a key system control unit 11, an engine control unit 12, a brake control unit 13, a driving support control unit 14, a communication unit 15, engine related actuators 16, brake related actuators 17, a sensor group 18, an output unit 19, a bus BS, the fluid pressure circuit 30, and a brake booster 41.

The driving support control unit 14 includes a recognition processor 14a for recognition of the outside environment and a control processor 14b for control of the vehicle 1 concerning driving support.

In the vehicle control apparatus 10, the key system control unit 11, the engine control unit 12, the brake control unit 13, and the recognition processor 14a and the control processor 14b in the driving support control unit 14 each include, for example, a processor, such as a central processing unit (CPU), and storage media including a read only memory (ROM) and a random access memory (RAM).

Operation programs for the key system control unit 11, the engine control unit 12, the brake control unit 13, the recognition processor 14a, and the control processor 14b are stored in the respective ROMs, and the operation programs stored in the ROMs are decomposed in the respective RAMs. The respective RAMs are also used for temporary storage of data used by the key system control unit 11, the engine control unit 12, the brake control unit 13, the recognition processor 14a, and the control processor 14b for processing.

The key system control unit 11, the engine control unit 12, the brake control unit 13, and the driving support control unit 14 (the recognition processor 14a and the control processor 14b) are connected to each other via the bus BS supporting, for example, controller area network (CAN) communication to enable mutual data communication.

The sensor group 18 collectively indicates various sensors provided in the vehicle 1. The sensors in the sensor group 18 include, for example, an engine rotation speed sensor 18a that detects the rotation speed of the engine, an accelerator position sensor 18b that detects the degree of depression of an accelerator pedal as an operation amount of the accelerator, and a brake stroke sensor 18c that detects the degree of depression of a brake pedal 25 provided in the vehicle 1 as the amount of stroke.

The sensors in the sensor group 18 also include a wheel speed sensor 18d that detects the number of revolutions of the wheels, a motion sensor 18e, such as an acceleration sensor or an angular velocity sensor, which detects a motion of the vehicle 1, a position sensor 18f that detects the position of the vehicle 1 using a global navigation satellite system (GNSS), such as a global positioning system (GPS), and a camera 18g that captures an image of vehicle interior and an image outside the vehicle, and so on.

In this example, the camera 18g includes a stereo camera for stereo imaging of an object outside the vehicle.

The communication unit 15 performs communication with a mobile terminal device used to lock and unlock a door lock of the vehicle 1, to start the engine, and so on. The mobile terminal device is, for example, a smart key and serves as a key of the vehicle 1. In this example, identification information about the mobile terminal device is stored in the mobile terminal device.

The key system control unit 11 compares the identification information received from the mobile terminal device by the communication unit 15 with identification information that is registered in advance to perform an authentication process to determine whether the identification information received from the mobile terminal device coincides with the identification information that is registered in advance. In response to a request to unlock the door lock, the key system control unit 11 unlocks the door lock if the authentication is established in the authentication process.

In addition, the key system control unit 11 supplies an engine start permission signal to the engine control unit 12 under the condition of the establishment of the authentication.

Furthermore, if the key system control unit 11 detects that the authentication process is illegally performed through rewriting of the registered identification information or the like, the key system control unit 11 outputs an illegality detection signal indicating that the authentication process is illegally performed.

The engine control unit 12 controls various actuators provided as the engine related actuators 16 based on a detection signal from a certain senor in the sensor group 18, operation input information with an operator, and so on. The various actuators concerning driving of the engine, such as a throttle actuator that drives a throttle valve and an injector that performs fuel injection, are provided as the engine related actuators 16.

The engine control unit 12 performs control to accelerate the vehicle 1 by driving the actuators including the throttle actuator and the injector described above based on request torque that is set based on the operation amount of the accelerator.

In addition, the engine control unit 12 performs start-stop control of the engine in response to an operation with an ignition switch or the like. At this time, the engine control unit 12 performs the start control of the engine under the condition that the engine start permission signal is received from the key system control unit 11.

The brake control unit 13 controls various actuators provided as the brake related actuators 17 and the brake booster 41 based on the detection signal from a certain sensor in the sensor group 18, the operation input information with the operator, and so on.

Figure 2:
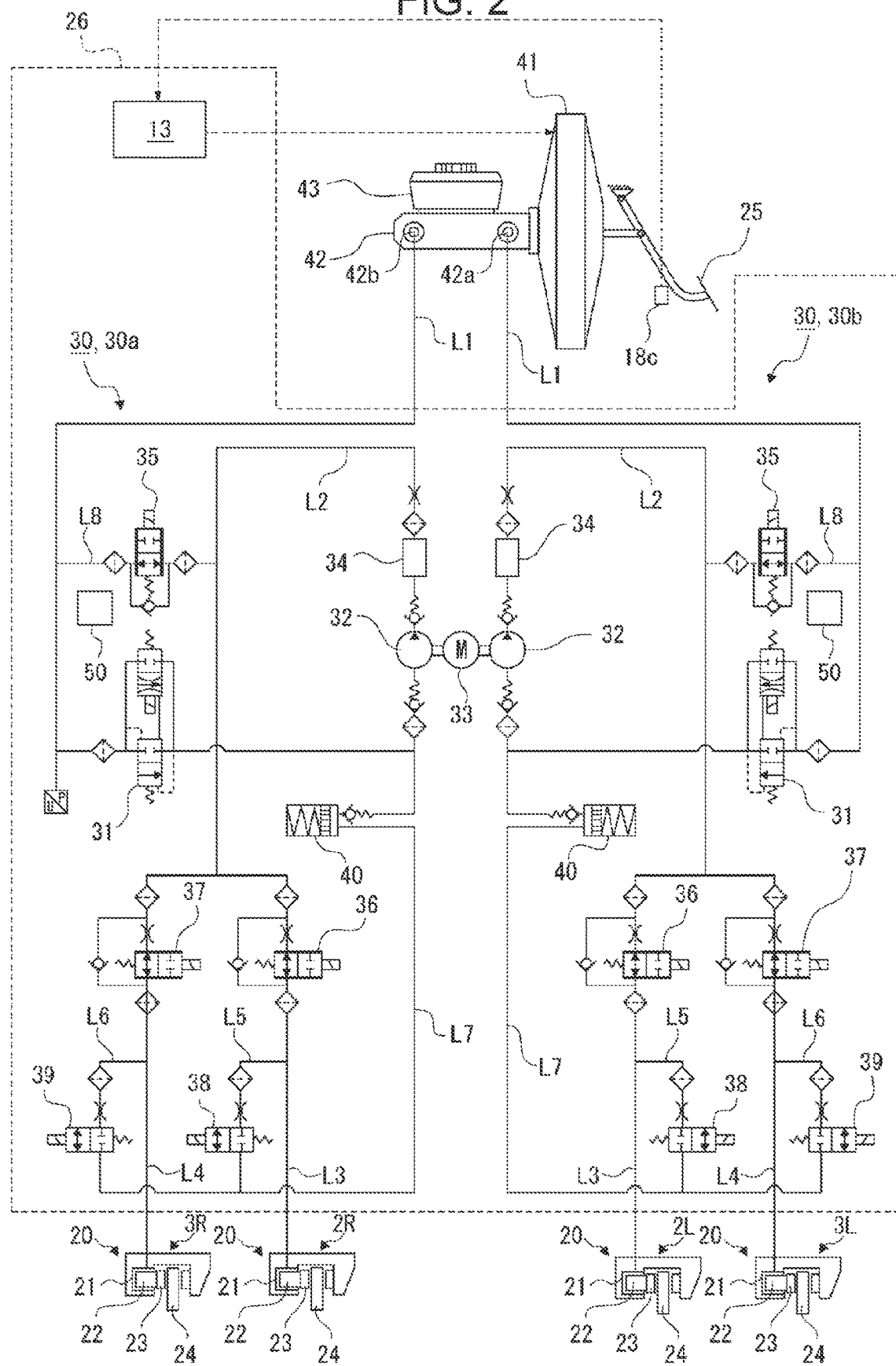
FIG. 2 illustrates an example of the configuration of a brake system provided in the vehicle control apparatus according to the embodiment.

The brake related actuators 17 include the various actuators for control of brake fluid pressure, such as gate-in valves 31, an electric motor 33, and bypass valves 35 provided in the fluid pressure circuit 30 for brake fluid, which are illustrated in FIG. 2 described below.

For example, the brake control unit 13 calculates the slip ratio of the wheels based on information about the wheel speed detected by the wheel speed sensor 18d and information about the vehicle body speed estimated from the information about the wheel speed and controls the brake related actuators 17 based on the information about the slip ratio to realize antilock braking system (ABS) control. In addition, the brake control unit 13 realizes electronic stability program (ESP) control under the control of the brake related actuators 17.

In particular, the brake control unit 13 in the present embodiment performs a brake control process in response to stop of the vehicle 1 through the driver emergency control described below. The brake control process will be described in detail below.

In the vehicle control apparatus 10 in this example, the brake control unit 13 is composed of a module in which the brake control unit 13 is integrally formed to the fluid pressure circuit 30 including the brake related actuators 17. The module in which the brake control unit 13 is integrally formed to the fluid pressure circuit 30 (including the brake related actuators 17) is herein referred to as a "brake control module 26."

The brake control system may be divided into a module including a processor as the brake control unit 13 and a module including the fluid pressure circuit 30. Although the former module may be provided in the vehicle interior and the latter module may be provided in an engine room in the above case, a configuration is adopted in this example in which the brake control module 26 to which the processor as the brake control unit 13 is integrally formed is disposed in the engine room.

The driving support control unit 14 performs a recognition process of the outside environment using the recognition processor 14a and the control processor 14b and issues instructions to the engine control unit 12, the brake control unit 13, and a steering control unit (a control unit to perform steering control) (not illustrated in FIG. 1) based on information about the result of the recognition process to perform driving control of the vehicle 1. In addition, the driving support control unit 14 controls the output unit 19 so as to perform information output for various warnings and notifications.

The output unit 19 collectively represents devices that are provided in the vehicle 1 and that perform visual, auditory, or tactile information output. The output devices in the output unit 19 are exemplified by, for example, an image display device, such as a liquid crystal display, various lamps, a sound emission device, such as a speaker (including the horn), and a tactile presentation device, such as a vibrator.

The recognition processor 14a performs recognition of the outside environment based on an image captured by the camera 18g. Objects to be recognized here include, for example, a road traffic line, such as a lane line on a road, a guardrail and a curbstone at a road side, a side wall, another vehicle, a pedestrian, and an obstacle. In the object recognition, recognition of the position (the relative position with respect to the vehicle 1) of an object is also performed. Use of an image captured by the stereo camera described above as an image captured by the camera 18g enables the position of a target object including information about the distance to the object to be recognized.

Although the example is described in which the outside environment is recognized based on an image captured by the camera 18g, for example, a recognition process based on information about the position of the vehicle 1, which is detected by the position sensor 18f, and map information may be used to recognize the outside environment. Information about how many lanes are provided on the road on which the vehicle 1 is running and which lane the vehicle 1 is running, information about the position of a road-side refuge place on the road on which the vehicle 1 is running, and information about the environment around the road on which the vehicle 1 is running (for example, information about a specific facility, such as a preschool or a school, around the road on which the vehicle 1 is running and information about the distance to the facility) are capable of being recognized from the map information.

The outside environment is capable of being recognized by various methods and the method of recognizing the outside environment is not limited to a specific method.

The control processor 14b issues instructions to the engine control unit 12, the brake control unit 13, and the steering control unit and controls the output unit 19 based on the result of the recognition of the outside environment by the recognition processor 14a to realize vehicle control concerning the driving support.

In particular, the control processor 14b in the present embodiment performs the driver emergency control, which is known as the MRM. The driver emergency control means control of the vehicle in response to detection of emergency of the driver, for example, means control to decelerate the vehicle 1 to the stopped state.

In the driver emergency control, the control processor 14b detects emergency of the driver based on an image captured by the camera 18g, for example, based on an image captured by a camera that captures an image of the driver in the vehicle interior. The detection of emergency of the driver may be performed based on the detection signal by a sensor other than the camera, such as the detection signal by a touch sensor provided on a steering wheel, and the method of detecting emergency of the driver is not limited to a specific method.

In the driver emergency control, the control processor 14b issues an instruction to stop the vehicle 1 at a certain refuge place, such as the road-side refuge place, to the brake control unit 13 based on the result of the recognition of the outside environment by the recognition processor 14a in response to detection of emergency of the driver. If the vehicle 1 is to be accelerated to move the vehicle 1 to the refuge place at this time, the control processor 14b issues an instruction to the engine control unit 12 to accelerate the vehicle 1. If the vehicle 1 is to be steered to move the vehicle 1 to the refuge place, the control processor 14b issues an instruction to the steering control unit described above to adjust the rudder angle of the steering wheel.

In addition, the control processor 14b controls the output unit 19 during activation of the driver emergency control so as to perform, for example, the information output for the warnings and the notifications to the inside of the vehicle and the outside of the vehicle. For example, the control processor 14b causes the output unit 19 to display warning information in the image display device or the like, to emit a warning tone with an in-vehicle speaker, or to beep the horn.

FIG. 2 illustrates an example of the configuration of a brake system provided in the vehicle control apparatus 10.

The brake system in the vehicle control apparatus 10 includes the brake mechanisms 20, the brake pedal 25, the brake stroke sensor 18c, the brake booster 41, a master cylinder 42, a reservoir tank 43, and the brake control module 26, as illustrated in FIG. 2.

The brake pedal 25 is coupled to the brake booster 41.

The brake stroke sensor 18c detects the amount of stroke of the brake pedal 25 and supplies the detection signal to the brake control unit 13.

The brake booster 41 is composed as an electric brake booster. The brake booster 41 moves a primary piston of the master cylinder 42 under the control of the brake control unit 13. For example, the brake booster 41 moves the primary piston by a movement amount corresponding to the degree of depression of the brake pedal 25. The brake booster 41 is mechanically connected to the brake pedal 25 so that the brake fluid pressure is capable of being supplied to the brake mechanisms 20 in response to an operation of the brake pedal 25, for example, in case of emergency.

The master cylinder 42 is, for example, a tandem master cylinder. The master cylinder 42 is connected to the reservoir tank 43 and is connected to the brake mechanisms 20 via the fluid pressure circuit 30. The master cylinder 42 generates the brake fluid pressure to apply the brake fluid pressure to the brake mechanisms 20 via the fluid pressure circuit 30.

Each of the brake mechanisms 20 is composed of, for example, a disk brake mechanism and is provided in each of the wheels 2R and 2L, which are the front wheels, and the wheels 3R and 3L, which are the rear wheels.

As illustrated in FIG. 2, the brake mechanisms 20 each include a brake caliper 21, a brake piston 22, a brake pad 23, and a brake rotor 24. The brake caliper 21 has a fluid pressure chamber (not illustrated in FIG. 2) receiving the brake fluid and the brake fluid pressure is applied to the brake caliper 21 via the fluid pressure circuit 30. The brake piston 22 is housed in the brake caliper 21 so as to be capable of sliding and moves (slides) in the brake caliper 21 with the brake fluid pressure applied to the brake caliper 21 (the fluid pressure chamber described above).

The brake pad 23 is connected with a tip of the brake piston 22 and is pressed onto the brake rotor 24, which is rotated with the wheels, in response to movement of the brake piston 22 with the brake fluid pressure. The brake mechanisms 20 brake the vehicle 1 (the wheels) in the above manner.

The fluid pressure circuit 30 is composed of two systems: a first fluid pressure circuit 30a and a second fluid pressure circuit 30b. The fluid pressure circuit 30 supports independent piping in the left-and-right direction in this example. The first fluid pressure circuit 30a is connected to the brake mechanisms 20 provided in the wheels 2R and 3R and the second fluid pressure circuit 30b is connected to the brake mechanisms 20 provided in the wheels 2L and 3L.

Since the first fluid pressure circuit 30a has the same configuration as that of the second fluid pressure circuit 30b, the same reference numerals are commonly used in the following description. Although terms of "upstream" and "downstream" of the brake fluid are used for the fluid pressure circuit 30, these mean the upper stream and the down stream when the master cylinder 42 is considered as a fluid source of the brake fluid.

The master cylinder 42 has a supply and exhaust port 42a and a supply and exhaust port 42b. A first flow path L1 is connected with each of the supply and exhaust port 42a and the supply and exhaust port 42b. In other words, an upstream end of the first flow path L1 is connected with the master cylinder 42 (the supply and exhaust port 42a and the supply and exhaust port 42b). The gate-in valve 31 is provided on the first flow path L1, and a downstream end of the first flow path L1 is connected with the node between a downstream end of a seventh flow path L7 described below and an upstream end of a second flow path L2 described below.

A low-pressure chamber 40 is provided on the seventh flow path L7, and a hydraulic pump 32 and a pulsation pressure reducing mechanism 34 are provided on the second flow path L2.

An upstream end of an eighth flow path L8 is connected with the first flow path L1. For example, the upstream end of the eighth flow path L8 is connected with a portion upstream of the gate-in valve 31 on the first flow path L1. The bypass valve 35 is provided on the eighth flow path L8. A downstream end of the eighth flow path L8 is connected with a portion downstream of the hydraulic pump 32 and the pulsation pressure reducing mechanism 34 on the second flow path L2.

A downstream end of the second flow path L2 is branched into a third flow path L3 and a fourth flow path L4.

A pressure valve 36 is provided on the third flow path L3 and a pressure valve 37 is provided on the fourth flow path L4.

In this example of the independent piping in the left-and-right direction, downstream ends of the third flow paths L3 are connected with the brake mechanism 20 (the brake caliper 21) of the wheel 2R and the brake mechanism 20 of the wheel 2L and downstream ends of the fourth flow paths L4 are connected with the brake mechanism 20 of the wheel 3R and the brake mechanism 20 of the wheel 3L.

Each of the third flow path L3 and the fourth flow path L4 may be connected with the brake mechanism 20 of any of the wheels. For example, in the case of cross piping, the third flow path L3 and the fourth flow path L4 of the first fluid pressure circuit 30a may be respectively connected with the brake mechanism 20 of the wheel 2R and the brake mechanism 20 of the wheel 3L and the third flow path L3 and the fourth flow path L4 of the second fluid pressure circuit 30b may be respectively connected with the brake mechanism 20 of the wheel 2L and the brake mechanism 20 of the wheel 3R.

An upstream end of a fifth flow path L5 is connected with a portion that is upstream of the downstream end connected to the brake mechanism 20 and that is downstream of the pressure valve 36 on the third flow path L3. An upstream end of a sixth flow path L6 is connected with a portion that is upstream of the downstream end connected to the brake mechanism 20 and that is downstream of the pressure valve 37 on the fourth flow path L4.

A pressure reduction valve 38 and a pressure reduction valve 39 are provided on the fifth flow path L5 and the sixth flow path L6, respectively. The seventh flow path L7 is connected with downstream ends of the fifth flow path L5 and the sixth flow path L6.

On the seventh flow path L7, the low-pressure chamber 40 is provided in a portion downstream of the node between the seventh flow path L7 and the downstream end of the fifth flow path L5 and the node between the seventh flow path L7 and the downstream end of the sixth flow path L6.

The low-pressure chamber 40 is provided to temporarily accumulate the brake fluid.

On the second flow path L2, the hydraulic pump 32 and the pulsation pressure reducing mechanism 34 are provided between the node between the second flow path L2 and the downstream end of the eighth flow path L8 and the node between the second flow path L2, and the downstream end of the seventh flow path L7 and the downstream end of the first flow path L1.

The hydraulic pumps 32 in the first fluid pressure circuit 30a and the second fluid pressure circuit 30b are driven with the common electric motor 33.

The pulsation pressure reducing mechanism 34 attenuates pulsation of the brake fluid injected from the hydraulic pump 32.

In this example, the gate-in valve 31, the pressure reduction valve 38, and the pressure reduction valve 39 are normally-closed electromagnetic solenoid valves, which close in a de-energized state and open in an energized state. In contrast, the bypass valve 35, the pressure valve 36, the pressure valve 37 are normally-open electromagnetic solenoid valves, which open in the de-energized state and close in the energized state.

The gate-in valve 31, the electric motor 33, the bypass valve 35, the pressure valve 36, the pressure valve 37, the pressure reduction valve 38, and the pressure reduction valve 39 are controlled by the brake control unit 13.

A locking unit 50 is provided for the bypass valve 35 in each of the first fluid pressure circuit 30a and the second fluid pressure circuit 30b in this example. The locking unit 50 will be described in detail below.

In a state in which the brake fluid pressure control, such as the ABS control or the ESP control, by the brake control unit 13 is not performed, the gate-in valve 31, the pressure reduction valve 38, the pressure reduction valve 39, which are the normally-closed valves, are in a closed state and the bypass valve 35, the pressure valve 36, and the pressure valve 37, which are the normally-open valves, are in an open state. The electric motor 33 is not driven and the hydraulic pump 32 is stopped.

If the driver depresses the brake pedal 25 in the state in which the brake control unit 13 does not perform the brake fluid pressure control, such as the ABS control, the brake fluid pressure generated by the master cylinder 42 passes through the first flow path L1, the eighth flow path L8, and the second flow path L2, is branched into the third flow path L3 and the fourth flow path L4, and is supplied to the brake mechanisms 20. The brake mechanisms 20 brake the wheels with the brake fluid pressure.

In contrast, during the brake fluid pressure control, such as the ABS control or the ESP control, the brake control unit 13 performs control so as to set the gate-in valve 31, which is the normally-closed valve, to the open state and set the bypass valve 35, which is the normally-open valve, to the closed state. Since the pressure valves 36 and 37 are the normally-open valves and the pressure reduction valves 38 and 39 are the normally-closed valves, as described above, the gate-in valve 31, the pressure valve 36, and the pressure valve 37 are in the open state and the bypass valve 35, the pressure reduction valve 38, and the pressure reduction valve 39 are in the closed state through the brake fluid pressure control.

The brake control unit 13 drives the electric motor 33 during the brake fluid pressure control, such as the ABS control or the ESP control.

Through the brake fluid pressure control, the hydraulic pump 32 is rotated in response to the driving by the electric motor 33 and the brake fluid accumulated in the reservoir tank 43 is suck into the first flow path L1 via the master cylinder 42, independent of the operation with the brake pedal 25.

The brake fluid suck into the first flow path L1 passes through the second flow path L2 via the gate-in valve 31, is branched into the third flow path L3 and the fourth flow path L4, and is supplied to the brake mechanisms 20. The brake mechanisms 20 brake the wheels with the applied brake fluid pressure.

When the fluid pressure to be applied to the brake mechanisms 20 is to be reduced, for example, when brake force is to be temporarily decreased in the ABS control, the brake control unit 13 controls the bypass valve 35 and the pressure valves 36 and 37 so as to be in the closed state and controls the pressure reduction valves 38 and 39 so as to be in the open state. The open state of the gate-in valve 31 (the normally-closed valve) is kept at this time.

As a result, the gate-in valve 31 and the pressure reduction valves 38 and 39 are in the open state and the bypass valve 35 and the pressure valves 36 and 37 are in the closed state.

The brake control unit 13 continues the driven state of the electric motor 33.

In this case, the hydraulic pump 32 is rotated in response to the driving by the electric motor 33 and the brake fluid in the brake mechanisms 20 (the brake calipers 21) flows into the seventh flow path L7 from the third flow path L3 and the fourth flow path L4 through the fifth flow path L5 and the sixth flow path L6, respectively. The brake fluid flowing into the seventh flow path L7 is accumulated in the low-pressure chamber 40.

The brake fluid pressure in the brake mechanisms 20 is reduced in the above manner to relieve the braking of the wheels by the brake mechanisms 20.

In the present embodiment, the brake control unit 13 performs brake control according to an embodiment when the vehicle 1 is stopped through the driver emergency control.

Figure 3:
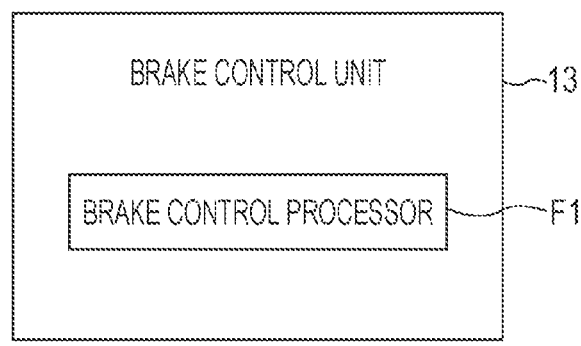
FIG. 3 is a functional block diagram illustrating a function according to the embodiment.

FIG. 3 is a functional block diagram illustrating a function according to an embodiment of the brake control unit 13.

As illustrated in FIG. 3, the brake control unit 13 has a function as a brake control processor F1. The brake control processor F1 performs the brake control process in which the brake fluid pressure is applied to the brake mechanisms 20 of the wheels at one side: the left-side wheels or the right-side wheels to lock the wheels at one side under the condition that the vehicle 1 is in the stopped state through the driver emergency control. For example, the brake control processor F1 performs the brake control so as to lock all the wheels at one side: the left side or the right side.

In this example, the brake control to lock the wheels at one side described above is realized by keeping the valves disposed on the brake fluid path to the brake mechanisms 20 at the closed state in a state in which the brake fluid pressure is applied to the brake mechanisms 20 in the fluid pressure circuit 30 at one side: the left side or the right side. For example, in this example, the locked state of the wheels at one side is to be kept, even if the brake control module 26 including the brake control unit 13 is powered off, by keeping the bypass valve 35, which is the normally-open valve, illustrated in FIG. 2, at the closed state.

The pressure valves 36 and 37 may be used as the normally-open valves for keeping the locked state, as described below.

The locking unit 50 is provided for the bypass valve 35 in this example to enable the bypass valve 35 to be kept at the closed state.

An example of the structure of the locking unit 50 and the bypass valve 35 will now be described with reference to FIG. 4 and FIG. 5.

Figure 4:
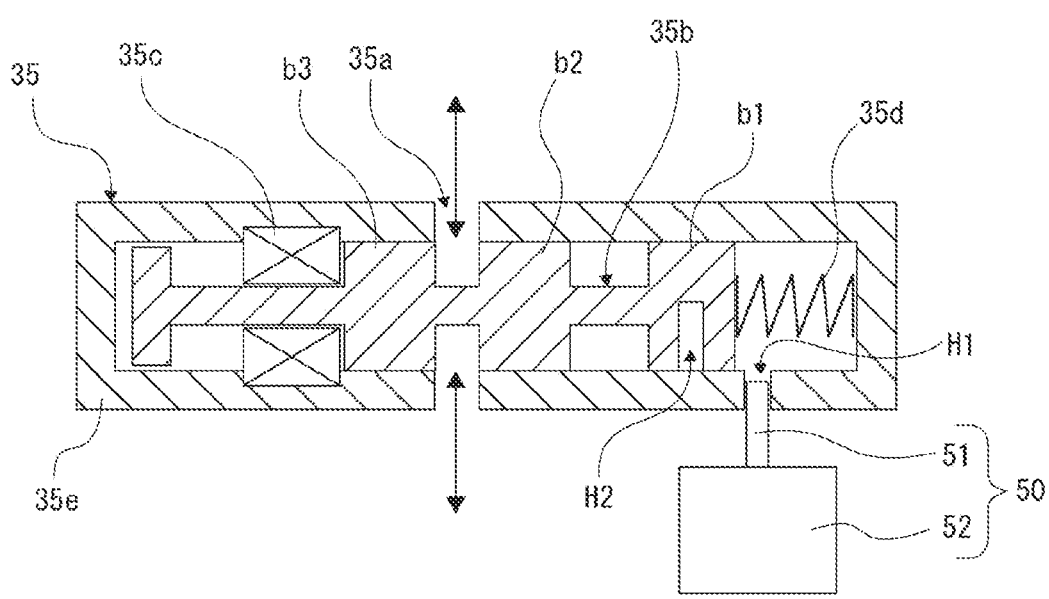
FIG. 4 is a diagram for describing an example of the structure of a locking unit and a bypass valve (a normally-open valve) in an embodiment (when the valve is in an open state)
Figure 5:
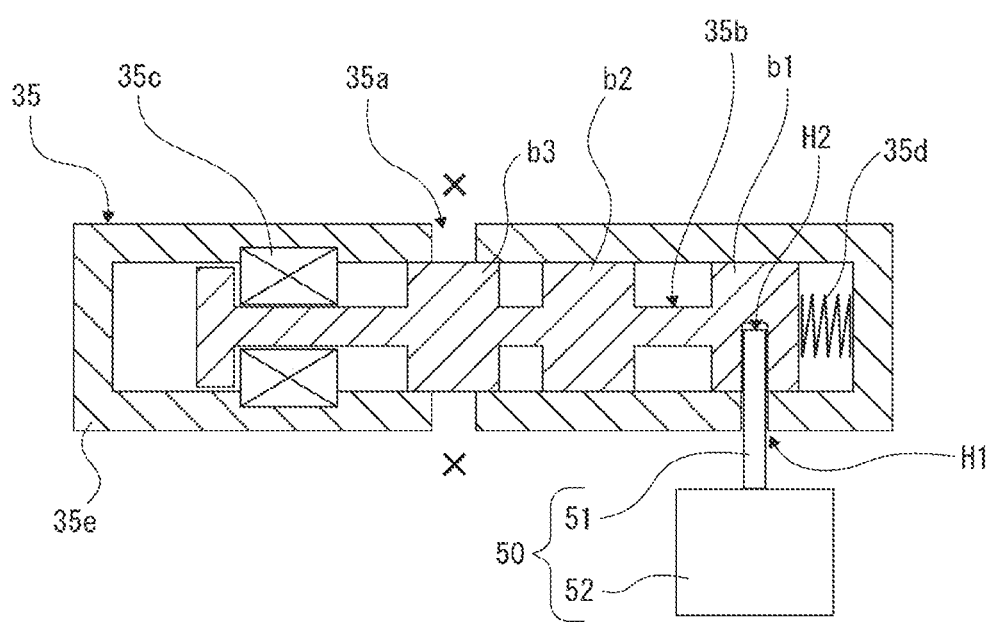
FIG. 5 is a diagram for describing an example of the structure of the locking unit and the bypass valve in the embodiment (when a closed state of the valve is kept)

A cross-sectional structure is illustrated in FIG. 4 and FIG. 5 as the structure of the bypass valve 35.

Although a spool valve is used for the bypass valve 35 in this example, a valve other than the spool valve may be used for the bypass valve 35.

In the bypass valve 35, a spool 35b, an electromagnetic coil 35c, and an urging member 35d are disposed inside a case 35e, which serves as, for example, an outer casing.

The case 35e has a through-hole 35a at a substantially central portion thereof, and a pipe composing a flow path of the brake fluid (a pipe of the eighth flow path L8 in this example: refer to FIG. 2) is connected with both ends of the through-hole 35a.

The spool 35b is formed into a substantially cylindrical shape and has multiple portions having reduced diameters.

In the spool 35b, large-diameter portions serve as sliding members (land members) b that slide with being in contact with the inner wall of the case 35e. The spool 35b has three sliding members b in this example, which are denoted by b1, b2, and b3 in FIG. 4 and FIG. 5.

The spool 35b composes a movable member in a solenoid actuator using the electromagnetic coil 35c and is driven in the right direction on the page in response to energization of the electromagnetic coil 35c (refer to transition from FIG. 4 to FIG. 5).

The urging member 35d has urging force in a direction in which the spool 35b is moved in a direction opposite to the driving direction.

The electromagnetic coil 35c is in the de-energized state in FIG. 4. In this state, since the spool 35b is driven to the left side on the page with the urging force of the urging member 35d and the through-hole 35a is not blocked by the sliding members b, as illustrated in FIG. 4, the bypass valve 35 is in the open state. In other words, the bypass valve 35 as the normally-open valve is realized.

In contrast, when the electromagnetic coil 35c is energized, the spool 35b is driven to the right direction on the page against the urging force of the urging member 35d. Since the through-hole 35a is blocked by the sliding member b (the sliding member b3 in this example) in this state, the bypass valve 35 is in the closed state.

The locking unit 50 includes a locking member 51 and a driver 52.

The locking member 51 is a columnar member, such as a substantially cylindrical member or a substantially prismatic member, in this example.

The driver 52 is configured so as to drive the locking member 51 in the axis direction through energization. The driver 52 is driven by the brake control unit 13, which is not illustrated in in FIG. 4 and FIG. 5.

The bypass valve 35 has a hole H1 and a hole H2 to keep the closed state in this example. As illustrated in FIG. 4 and FIG. 5, the hole H1 runs through part of the case 35e and the hole H2 is formed in any of the sliding members b (the sliding member b1 in this example) of the spool 35b.

The locking unit 50 is disposed at a position at which the locking member 51 passes through the hole H1 when the locking member 51 is driven in a direction in which the locking member 51 is projected from the driver 52.

In the bypass valve 35, the hole H2 is formed at a position at which the hole H2 communicates with the hole H1 in a state in which the spool 35b is driven so as to set the bypass valve 35 to the closed state.

When the bypass valve 35 is in the open state, the driving of the locking member 51 by the driver 52 is not performed and the locking member 51 is in a state in which the leading end of the locking member 51 is not inserted into the hole H2, as illustrated in FIG. 4.

In contrast, when the bypass valve 35 is kept at the closed state, the locking member 51 is driven by the driver 52 in the direction in which the locking member 51 is projected from the driver 52. This causes the leading end of the locking member 51 to be inserted into the hole H2 through the hole H1, as illustrated in FIG. 5. As a result, the spool 35b is fixed at a position at which the bypass valve 35 is set to the closed state and the closed state of the bypass valve 35 is kept.

Figure 6A:
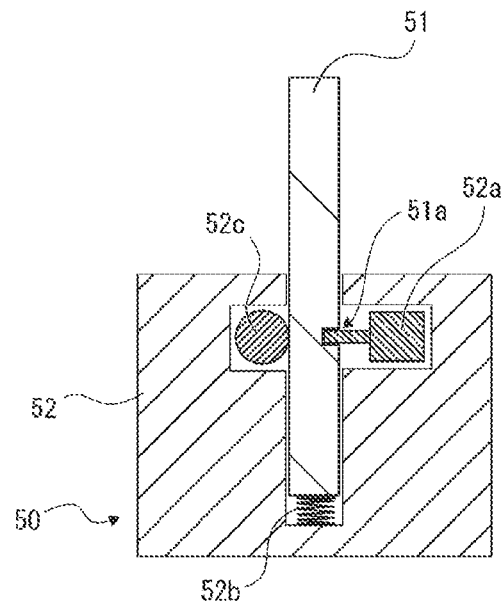
FIG. 6A and FIG. 6B are cross-sectional views for describing an example of the configuration of a driver in the locking unit in the embodiment.
Figure 6B:
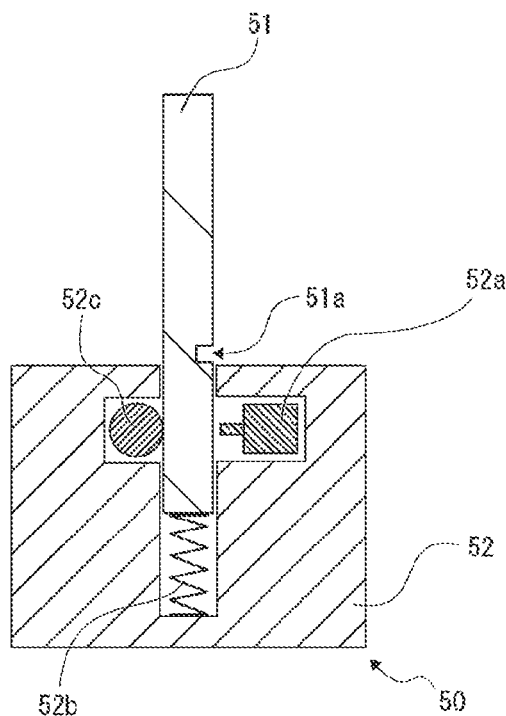

FIG. 6A and FIG. 6B are cross-sectional views for describing an example of the configuration of the driver 52 in the locking unit 50. FIG. 6A illustrates a state before the locking member 51 is driven and FIG. 6B illustrates a state after the locking member 51 is driven.

As illustrated in FIG. 6A and FIG. 6B, the driver 52 includes a first actuator 52a, an urging member 52b, and a second actuator 52c.

In this case, the locking member 51 has a hole 51a.

The first actuator 52a is configured as a solenoid actuator that causes a translational motion of a movable member of, for example, a rod shape.

The urging member 52b urges the locking member 51 in the direction in which the locking member 51 is projected from the driver 52.

In the state before the locking member 51 is driven illustrated in FIG. 6A, the leading end of the movable member of the first actuator 52a is inserted into the hole 51a of the locking member 51 and the locking member 51 is locked in a non-projected state.

In contrast, when the locking member 51 is to be projected from the driver 52 to lock the bypass valve 35, the first actuator 52a is energized to clear the locked state of the locking member 51. In this case, the locking member 51 is driven in the projection direction with the urging force of the urging member 52b. In other words, the locked state of the bypass valve 35 illustrated in FIG. 5 is realized.

In the driver 52, the second actuator 52c is provided as an actuator for retuning the locking member 51, which is in a projected state, to the non-projected state. For example, an actuator as a motor is used as the second actuator 52c. For example, gears rotated by the motor as the second actuator 52c are provided and a lack member to be engaged with the gears is provided on a side face of the locking member 51. This enables the position of the locking member 51 to be returned to the position of the non-projected state against the urging force of the urging member 52b in response to energization of the second actuator 52c.

As described above, the leading end of the movable member of the first actuator 52a is inserted into the hole 51a after the locking member 51 is returned to the position of the non-projected state to enable the locking member 51 to be returned to the state before the locking member 51 is driven illustrated in FIG. 6A.

Adopting, for example, the configuration illustrated in FIG. 6A and FIG. 6B enables the locking unit 50 to be returned again to the state in which the locking of the bypass valve 35 is available after the bypass valve 35 is set to the locked state.

The configuration concerning the keeping of the closed state of the bypass valve 35 described above is an example and the configuration is not limited to the above one.

For example, the number of the sliding members b is not limited to three and at least one sliding member b may be provided. The hole H2 may be provided in any of the sliding members b. The hole H2 is not limitedly provided in the sliding member b and may be provided in a portion other than the sliding members b of the spool 35b.

Also in application to a valve other than the spool valve, a configuration may be adopted in which the member that opens and closes the valve is mechanically locked at a position at which the valve is set to the closed state.

The above configuration for returning the locking unit 50 to the state in which the locking of the bypass valve 35 is available is an example, and another configuration may be adopted to return the locking unit 50 to the state in which the locking of the bypass valve 35 is available.

Referring back to FIG. 3, the brake control processor F1 performs the brake control to lock the wheels at one side described above under the condition that the key of the vehicle 1 is not detected after the vehicle 1 is set to the stopped state through the driver emergency control. In other words, the brake control processor F1 performs the brake control under the condition that the mobile terminal device described above is not detected in a communication available range by the key system control unit 11 illustrated in FIG. 1.

When the key of the vehicle 1 is in the non-detection state after the vehicle 1 is stopped through the driver emergency control, the possibility that the driver is rescued and the unmanned vehicle is left may be high.

Accordingly, the above configuration is desirable because the lock control of the wheels at one side is available against the high possibility of theft.

The brake control processor F1 in this example determines which side of the wheels are to be locked based on the result of the recognition of the outside environment of the vehicle 1 in the brake control to lock the wheels at one side.

Figure 7:
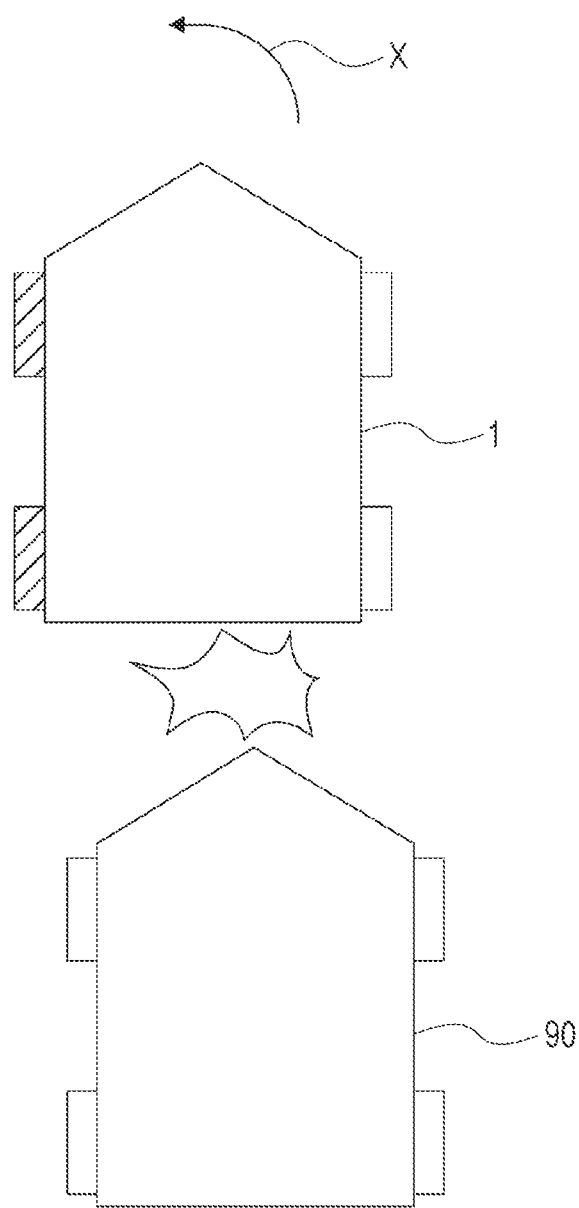
FIG. 7 is a diagram for describing yaw moment occurring at a vehicle when another vehicle collides with the vehicle from behind.

FIG. 7 is a diagram for describing yaw moment (yawing moment) occurring at the vehicle 1 when another vehicle 90 collides with the vehicle 1 from behind.

For example, when the wheels on the left side of the vehicle 1 are locked, as illustrated by hatched areas in FIG. 7, counterclockwise yaw moment, which is illustrated by an arrow X in FIG. 7, occurs in response to the collision of the vehicle 90 from behind (collision from straight behind). When the wheels on the right side are locked, clockwise yaw moment occurs in response to the collision of the vehicle 90 from behind although not illustrated in FIG. 7.

Various methods of determining the wheels to be locked based on the result of the recognition of the outside environment are proposed.

For example, if a traffic lane is recognized at the right side of the vehicle 1, it is desirable to avoid deviation of the vehicle 1 to the right side in response to collision from behind. Accordingly, when the traffic lane is recognized at the right side of the vehicle 1, the wheels on the left side may be determined to be the wheels to be locked.

Alternatively, if a facility, such as a preschool or a school, where many people gather together is recognized within a close distance at the left side even when the traffic line is recognized at the right side, the wheels on the right side may be determined to be the wheels to be locked in order to prevent deviation of the vehicle 1 to the left side (because other vehicles on the traffic lane may avoid the deviated vehicle 1).

In the determination of the wheels to be locked, the wheels at a side that is more secure when the vehicle 1 is deviated in response to collision of an object are determined to be the wheels to be locked based on the positional relationship between the vehicle 1 and one or more recognized objects, such as a traffic lane, another vehicle, a pedestrian, an obstacle, and/or a facility such as a school, which are recognized outside the vehicle.

Since the locking of the wheels at one side, instead of all the wheels, makes it difficult for a thief to move the vehicle 1 over a long distance for taking-away and reduces drag resistance, compared with that when all the wheels are locked, it is possible for a person other than the thief to move the vehicle 1 over a short distance in order to evacuate the vehicle 1 to a safety place. In addition, since the locking of the wheels at one side makes it difficult to move the vehicle 1 in a desired direction when the vehicle 1 is towed, it takes time for the thief to load the vehicle 1 on a loading vehicle and the motivation of the thief to take away the vehicle 1 is capable of being reduced.

Accordingly, it is possible to achieve both the vehicle theft prevention and the securement of the portability of the vehicle to a safety place after the vehicle is stopped through the driver emergency control.

The control to lock all the wheels at one side is performed as the lock control of the wheels at one side in this example. This increases the drag resistance, compared that in the locking of one wheel at one side. Accordingly, it is possible to make the vehicle towing or the like by the thief difficult to improve the effect of preventing the theft.

In the present embodiment, the brake control processor F1 starts drag control of the brake in response to an effective accelerator operation after the vehicle 1 is stopped through the driver emergency control. The effective accelerator operation here means an accelerator operation that is to be accepted as an instruction to accelerate the vehicle 1. For example, an accelerator operation when the engine is not started is not accepted as the instruction to accelerate the vehicle 1. The effective accelerator operation here means an accelerator operation that is to be accepted as the instruction to accelerate the vehicle 1, for example, an accelerator operation after the engine is started and the transmission is shifted to a drive range (a D range or an R range).

The drag control of the brake here means control to issue an instruction to accelerate the vehicle 1 with shift request torque, which is greater than the request torque corresponding to the accelerator operation by an amount corresponding to shift torque, to an acceleration control unit (the engine control unit 12 in this example) and to apply the brake fluid pressure for cancellation of the shift torque to the brake mechanisms 20.

For example, all the wheels are to be subjected to the drag control of the brake in this example.

Starting the drag control of the brake in response to detection of the effective accelerator operation after the vehicle 1 is stopped through the driver emergency control in the above manner enables the vehicle 1 to run but causes the brake to be in a dragged state during running if the vehicle 1 is left in a state in which the key is left, that is, if the vehicle 1 is left in a state in which driving by a third person, such as a thief, is available after the vehicle 1 is stopped through the driver emergency control. Although the thief attempts to cancel the control if the thief has noticed that the brake control for theft prevention is activated, the vehicle 1 is accelerated in response to the accelerator operation during the drag control and, thus, it is possible to make it difficult for the thief to notice the activation of the brake control. Since the drag control of the brake is continued while the vehicle 1 is running, fading of the brake will occur and it makes difficult for the thief to drive and take away the vehicle 1. In other words, it is possible to reduce the motivation of the thief to take away the vehicle 1.

In this example, the brake control processor F1 notifies an occupant of an occurrence of brake failure during the drag control of the brake described above. For example, the brake control processor F1 controls the output unit 19 so as to display a screen or emit a sound for the notification.

The brake control processor F1 performs control (controls the output unit 19) not to turn on a brake lamp in response to application of the brake fluid pressure to the brake mechanisms 20 for cancellation of the shift torque during the drag control of the brake described above. In contrast, the brake control processor F1 performs control to turn on the brake lamp in response to an operation with the brake pedal 25 during the drag control of the brake.

A situation in which a good-willed third party, not a thief, drives the vehicle 1 to move the vehicle 1 to a safety place may be considered as the situation in which the vehicle 1 is running in the state in which the key is left after the vehicle 1 is stopped through the driver emergency control. The notification of the brake failure described above enables the good-willed third party to be prompted to cautiously drive the vehicle 1 with the speed of the vehicle 1 being lessened, when the good-willed third party is driving the vehicle 1, to make it difficult to cause the fading of the brake.

The brake lamp control described above makes it difficult for the thief to notice the activation of the brake control for the theft prevention. In particular, the brake lamp control described above is desirable in the nighttime because the theft easily notices the turning-on of the brake lamp independently of the brake operation by the theft.

In addition, the brake lamp control described above prevents the brake lamp from being turned on during acceleration of the vehicle 1. Accordingly, it is possible to prevent driving of another vehicle, such as a vehicle behind, from being impeded.

When the fading of the brake occurs, surrounding people are likely to pay attention to the vehicle 1 owing to sound or light (for example, spark) from the brake mechanisms 20. In addition, smell, such as burned smell, is also emitted from the brake mechanisms 20 when the fading of the brake occurs. The motivation of the thief to take away the vehicle 1 is reduced also by the sound, the light, or the smell associated with the fading of the brake to improve the effect of preventing the theft also in this point.

Since the brake pad 23 and/or the brake rotor 24, which are inexpensive, are damaged even if the fading of the brake occurs due to the drag control of the brake, it is easy to restore the brake pad 23 and/or the brake rotor 24.

An example of a specific processing process for realizing the brake control according to the embodiment described above will now be described with reference to a flowchart illustrated in FIG. 8.

Figure 8:
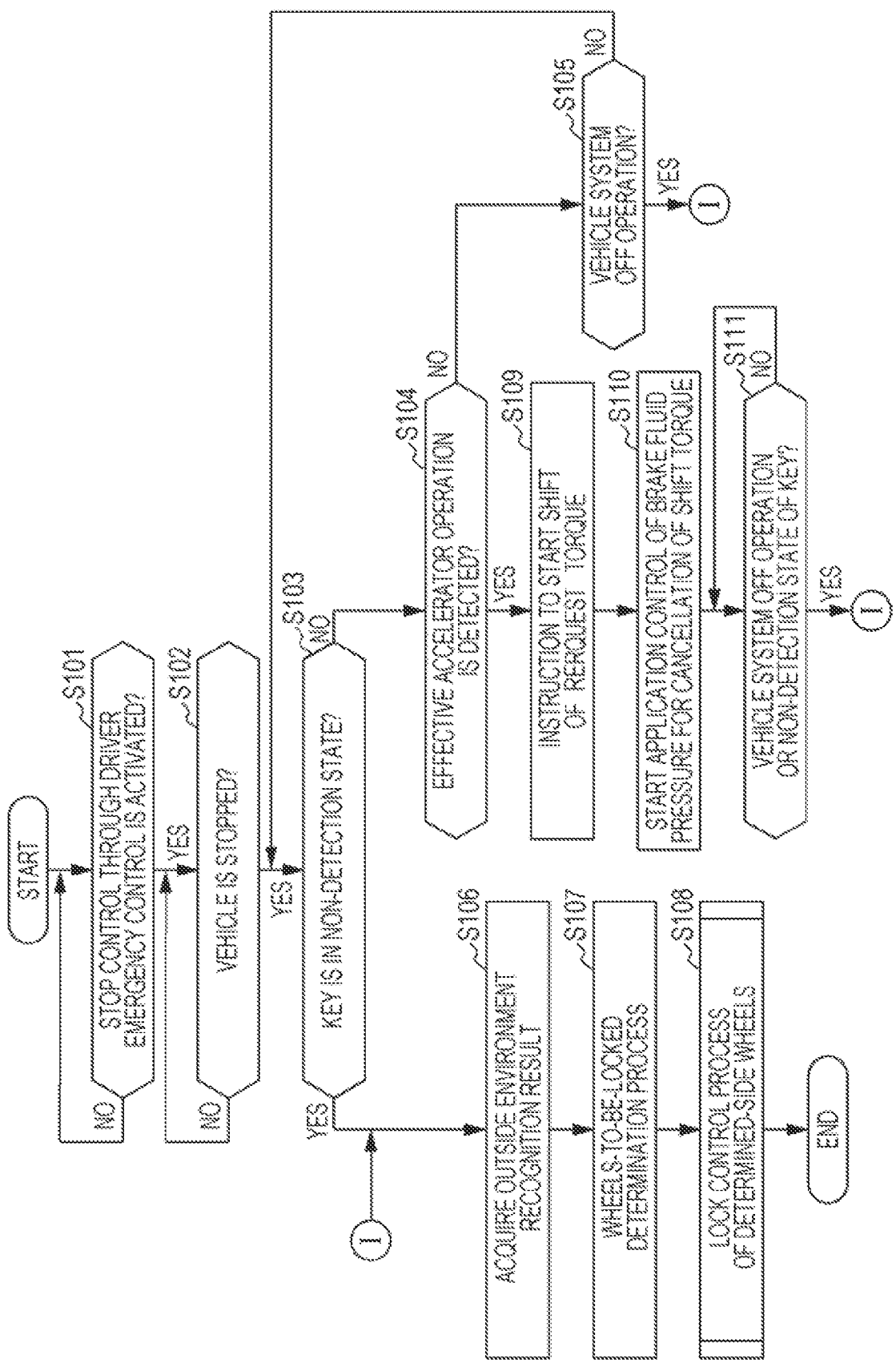
FIG. 8 is a flowchart illustrating a specific processing process for realizing a brake control process according to the embodiment.

The process illustrated in FIG. 8 is performed by the CPU in the brake control unit 13 in accordance with, for example, a program stored in a storage medium, such as the ROM, in the brake control unit 13.

Referring to FIG. 8, in Step S101, the brake control unit 13 waits for activation of the driver emergency control. If the driver emergency control is activated, in Step S102, the brake control unit 13 waits for stop of the vehicle 1.

If the brake control unit 13 determines that the vehicle 1 is stopped (YES in Step S102), in Step S103, the brake control unit 13 determines whether the key is in the non-detection state. In other words, the brake control unit 13 determines whether the mobile terminal device serving as the key of the vehicle 1 is not detected within the communication available range by the key system control unit 11.

If the brake control unit 13 determines that the key is not in the non-detection state (NO in Step S103), in Step S104, the brake control unit 13 determines whether the effective accelerator operation is detected. In other words, the brake control unit 13 determines whether the accelerator operation that is to be accepted as the instruction to accelerate the vehicle 1 described above is detected.

If the brake control unit 13 determines that the effective accelerator operation is not detected (NO in Step S104), in Step S105, the brake control unit 13 determines whether a vehicle system OFF operation is performed, that is, whether an operation to power off the vehicle control apparatus 10 is performed. If the brake control unit 13 determines that the vehicle system OFF operation is not performed (NO in Step S105), the process goes back to Step S103.

A loop process to wait establishment of any of the conditions: the non-detection state of the key, the effective accelerator operation, and the vehicle system OFF operation is formed by Steps S103, S104, and S105 described above.

If the brake control unit 13 determines that the key is in the non-detection state (YES in Step S103), in Step S106, the brake control unit 13 acquires the result of the recognition of the outside environment by the recognition processor 14a. In Step S107, the brake control unit 13 performs a process to determine the wheels to be locked. Since the process to determine the wheels to be locked based on the result of the recognition of the outside environment is described above, a duplicated description of this step is omitted herein.

In Step S108, the brake control unit 13 performs the lock control process of the wheels at the determined side. Then, the process illustrated in FIG. 8 is terminated.

Figure 9:
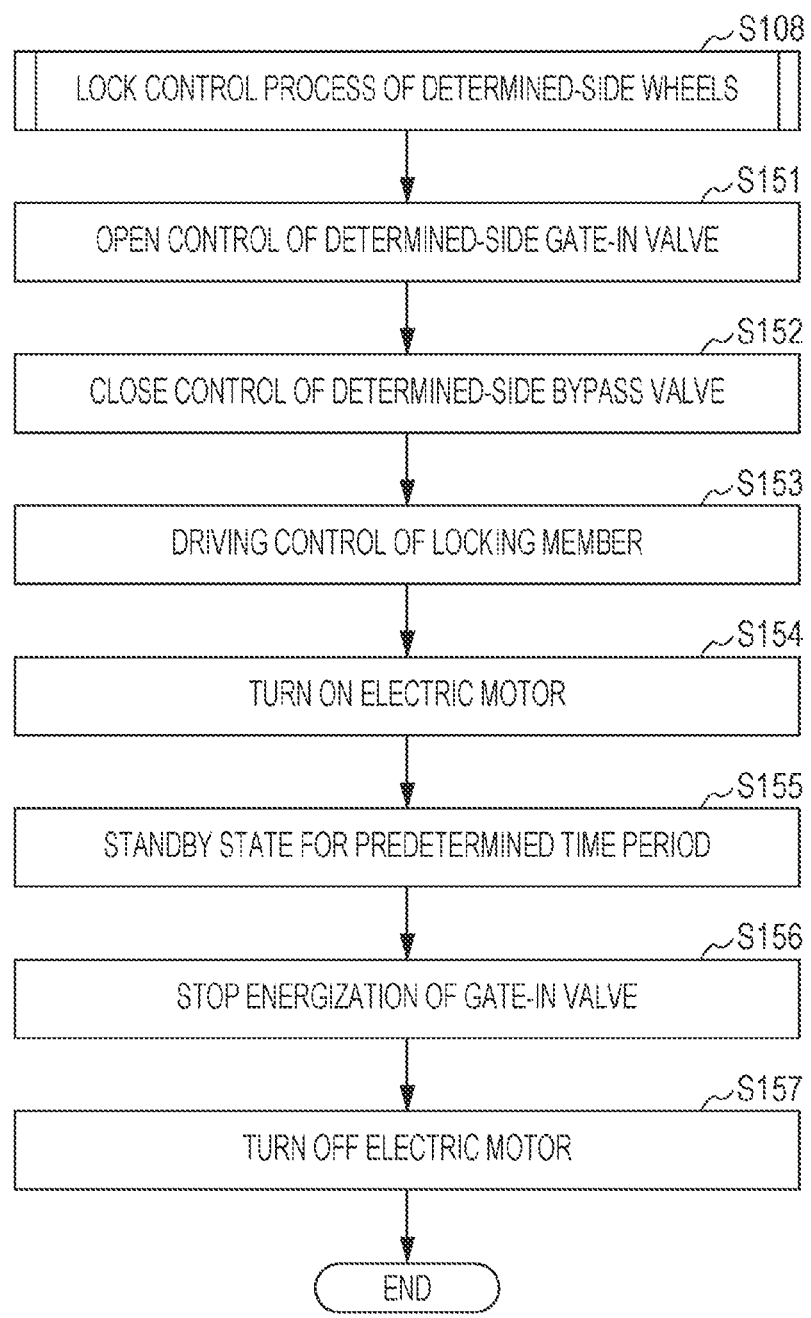
FIG. 9 is a flowchart illustrating a lock control process of wheels at one side according to the embodiment.

FIG. 9 is a flowchart illustrating the lock control process in Step S108.

In the lock control process in Step S108, in Step S151, the brake control unit 13 performs control to open the gate-in valve 31 at the determined side. In other words, the brake control unit 13 controls the gate-in valve 31 (the normally-closed valve) in the fluid pressure circuit 30 for the wheels at the side determined in Step S107, among the first fluid pressure circuit 30a (the fluid pressure circuit 30 for the wheels on the right side) and the second fluid pressure circuit 30b (the fluid pressure circuit 30 for the wheels on the left side) illustrated in FIG. 2, so as to be set to the open state.

This enables the brake fluid in the reservoir tank 43 to be drawn to the brake mechanisms 20 side via the gate-in valve 31 in the fluid pressure circuit 30 for the wheels at the side to be locked.

In Step S152, the brake control unit 13 performs control to close the bypass valve 35 (the normally-open valve) at the determined side. In Step S153, the brake control unit 13 performs driving control of the locking member 51. For example, the brake control unit 13 drives the locking member 51 in the projection direction by controlling the driver 52 (the first actuator 52a) to keep the bypass valve 35 in the closed state.

In Step S154, the brake control unit 13 turns on the electric motor 33. In Step S155, the brake control unit 13 is in a standby state for a predetermined time period. In Step S156, the brake control unit 13 stops energization of the gate-in valve 31. In Step S157, the brake control unit 13 turns off the electric motor 33. Then, the lock control process in Step S108 is terminated.

The hydraulic pump 32 is driven for a predetermined time period and the brake fluid in the reservoir tank 43 is drawn into the target brake mechanisms 20 via the first flow path L1 (the gate-in valve 31), the second flow path L2, the third flow path L3, and the fourth flow path L4 through Step 154 to Step S157 described above. In other words, the brake fluid pressure is capable of being applied to the target brake mechanisms 20.

Since the bypass valve 35 is kept at the closed state through Step S152 and Step S153, a fluid pressure applied state to the brake mechanisms 20 is kept even if the electric motor 33 is turned off in Step S157 to continue the locked state of the wheels at one side.

In the lock control process of the wheels at one side described above, the close control of the bypass valve 35 (Step S152) and the driving control of the locking member 51 (Step S153) may be performed before the open control of the gate-in valve 31 (Step S151).

The stop of the energization of the gate-in valve 31 (Step S156) may not be performed when the gate-in valve 31 is configured as a valve that transmits the brake fluid from the upstream side to the downstream side.

Referring back to FIG. 8, if the brake control unit 13 determines that the vehicle system OFF operation is performed (YES in Step S105), the process goes to Step S106. In other words, the lock control of the wheels at one side (Step S108) is performed if the vehicle control apparatus 10 is turned off even when the key is not in the non-detection state after the vehicle 1 is stopped through the driver emergency control.

The non-detection state of the key may be used as a prerequisite condition to perform the lock control of the wheels at one side.

If the brake control unit 13 determines that the effective accelerator operation is detected (YES in Step S104), in Step S109, the brake control unit 13 issues an instruction to start shift of the request torque to the engine control unit 12. In other words, the instruction to start acceleration control using the shift request torque described above is issued as the request torque used in the acceleration control of the vehicle 1.

In Step S110, the brake control unit 13 starts control to apply the brake fluid pressure for cancellation of the shift torque.

The brake fluid pressure for cancellation of the shift torque may be the brake fluid pressure that is set so as to completely cancel the shift torque or may be the brake fluid pressure that is set so as to cancel part of the shift torque.

The shift torque may be varied with the operation amount of the accelerator and, in response to this, the brake fluid pressure for cancellation of the shift torque may also be varied with the operation amount of the accelerator.

The application of the brake fluid pressure for cancellation of the shift torque is performed using the hydraulic pump 32 (the electric motor 33) in this example. For example, control is performed for both the first fluid pressure circuit 30a and the second fluid pressure circuit 30b, in which the electric motor 33 is turned on in the state in which the gate-in valve 31 is opened and the bypass valve 35 is closed to apply the brake fluid pressure to the brake mechanisms 20, as in the lock control of the wheels at one side described above with reference to FIG. 9.

The application of the brake fluid pressure for cancellation of the shift torque may be performed using the brake booster 41. However, in this case, the brake pedal 25 is moved in response to the application of the fluid pressure to increase the risk of the thief who notices the activation of the brake control for the theft prevention. The application of the fluid pressure using the electric pump described above prevents an occurrence of such a risk to improve the effect of preventing the theft.

The driving sound of the electric motor 33 may be reduced by, for example, decreasing the driving speed of the electric pump to make it more difficult for the thief to notice the activation of the brake control for theft prevention.

The brake control unit 13 in this example causes the output unit 19 to perform the information output for the notification of the brake failure described above during the drag control of the brake.

In addition, the brake control unit 13 in this example performs the control not to turn on the brake lamp in response to the application of the brake fluid pressure for cancellation of the shift torque during the drag control of the brake.

After starting the control to apply the brake fluid pressure in Step S110, in Step S111, the brake control unit 13 waits for establishment of either of the conditions: the vehicle system OFF operation and the non-detection state of the key. If the brake control unit 13 determines that either of the conditions is established (YES in Step S111), the process goes back to Step S106 described above.

As described above, in this example, after the drag control of the brake is started, the lock control of the wheels at one side is performed in response to the operation to power off the vehicle control apparatus 10 or the non-detection state of the key.

Accordingly, the lock control of the wheels at one side is performed if the thief gives up the driving of the vehicle 1 for taking-away and lefts the vehicle 1. Consequently, it is possible to prevent further occurrences of the theft, such as taking-away of the vehicle 1 by another thief.

The driver or the good-willed third party may return the vehicle 1 to the state before the lock control of the wheels at one side is activated after the lock control of the wheels at one side is activated although a description of this with reference to the drawing is omitted herein.

In order to achieve this, the lock state (keeping of the closed state) of the bypass valve 35 is cleared. In this example, the brake control unit 13 drives the second actuator 52c in the driver 52 to return the locking member 51 to the position of the non-projected state. This returns the bypass valve 35 to the open state with the urging force of the urging member 35d to enable the brake fluid to be returned to the upstream side (the master cylinder 42 and the reservoir tank 43) via the eighth flow path L8.

In addition, the lock control of the wheels at one side is capable of being returned to the executable state again by driving the first actuator 52a to insert the leading end of the movable member of the first actuator 52a into the hole 51a of the locking member 51.

Cancellation of the lock control of the wheels at one side is desirably performed by a certain organization, for example, a public organization, such as police, or a neutral organization, such as a dealer, using a certain tool.

The embodiments are not limited to the examples described above and various modifications are available.

For example, although the disk brake mechanism is exemplified as the brake mechanisms 20 in the above description, the disclosure is applicable to a case in which a brake mechanism of another form, such as a drum brake mechanism, is adapted.

Although the example is described above in which the lock control of the wheels at one side is performed under the condition that the vehicle 1 is stopped through the driver emergency control, the lock control of the wheels at one side may be performed under the condition that the vehicle 1 is in a substantially stopped state through the driver emergency control. The "substantially stopped" here means, for example, a state in which the speed of the vehicle 1 per hour is very low (for example, 10 km/h or less or 5 km/h or less). Setting the substantially stopped state as the condition enables the lock control of the wheels at one side to be performed, for example, when the driver is rescued while the vehicle 1 is running at a very low speed before the vehicle 1 is stopped through the driver emergency control.

Although the example is described above in which the bypass valve 35 is set to the closed state to keep the fluid pressure applied state to the brake mechanisms 20 in the lock control of the wheels at one side, the pressure valves 36 and 37, which are the downstream-side normally-open valves, may be set to the closed state to keep the fluid pressure applied state to the brake mechanisms 20. In this case, after the fluid pressure is applied to the brake mechanisms 20, the pressure valves 36 and 37 are kept at the closed state. In addition, in this case, the locking unit 50 described above with reference to FIG. 4 to FIG. 6 is provided for the pressure valves 36 and 37.

In the configuration in which the fluid pressure applied state to the brake mechanisms 20 for the locking of the wheels at one side is kept using the pressure valves 36 and 37, the locking of the wheels at one side is capable of being realized even when a piping method other than the independent piping in the left-and-right direction is adopted, for example, when the cross piping is adopted in the fluid pressure circuit 30.

Although the example is described above in which the application of the brake fluid pressure for cancellation of the shift torque is performed using the electric pump in the drag control of the brake, the fluid pressure applied state for cancellation of the shift torque may be achieved in the brake mechanisms 20 by leaving the fluid pressure that has occurred in response to an operation with the brake pedal 25 in the brake mechanisms 20 under the control of the normally-open valve (the pressure valves 36 and 37 or the bypass valve 35) in the fluid pressure circuit 30.

Although the example is described above in which the brakes of all the wheels are dragged in the drag control of the brake, the brake of at least one wheel may be dragged. In one example, dragging of the brakes of driving wheels or dragging of the brakes of non-driving wheels is considered.

Although the vehicle 1 is exemplified as the engine vehicle including the engine as the driving source of the wheels, the disclosure is applicable to a hybrid vehicle including both the engine and the motor as the driving sources of the wheels and an electric vehicle including the motor as the driving source of the wheels.

As described above, the vehicle control apparatus (the vehicle control apparatus 10) according to an embodiment in the vehicle (1) that comprises left and right wheels each comprising the brake mechanism (20) comprises one or more processors (the CPU in the brake control unit 13) and one or more storage media (the ROM in the brake control unit 13) storing a program executed by the one or more processors.

The program comprises one or more instructions. The instruction causes the one or more processors to perform a brake control process in which brake fluid pressure is applied to the brake mechanisms of the wheels at one side: left-side wheels or right-side wheels to set the wheels at one side to a locked state under the condition that the vehicle is in a stopped state or in a substantially stopped state through driver emergency control, which is control of the vehicle in response to detection of emergency of a driver who drives the vehicle.

With the above configuration, the wheels at one side: the left-side wheels or the right-side wheels are locked when the vehicle is in the stopped state or the substantially stopped state through the driver emergency control, which is known as the MRM. Since the locking of the wheels at one side, instead of all the wheels, makes it difficult for a thief to move the vehicle over a long distance for taking-away and reduces the drag resistance, compared with that when all the wheels are locked, it is possible for a person other than the thief to move the vehicle over a short distance in order to evacuate the vehicle to a safety place. In addition, since the locking of the wheels at one side makes it difficult to move the vehicle in a desired direction when the vehicle is towed, it takes time for the thief to load the vehicle on a loading vehicle and the motivation of the thief to take away the vehicle is capable of being reduced.

Accordingly, it is possible to achieve both the vehicle theft prevention and the securement of the portability of the vehicle to a safety place after the vehicle is stopped through the driver emergency control.

Measures to take the brake fluid pressure out of the brake mechanism 20 at the locked side by the thief may be considered as measures against the lock control of the wheels at one side. However, since the brake at the non-locked side is applied when such measures are adopted, it is difficult to drive the vehicle and, thus, the motivation of the thief to take away the vehicle is capable of being reduced also in this point.

In the vehicle control apparatus according to the embodiment, in the brake control process, the control (the locking of the wheels at one side) is performed under the condition that the key of the vehicle is in the non-detection state after the vehicle is in the stopped state through the driver emergency control.

When the key of the vehicle is in the non-detection state after the vehicle is stopped through the driver emergency control, the possibility that the driver is rescued and the unmanned vehicle is left may be high.

Accordingly, the above configuration is desirable because the lock control of the wheels at one side is available against the high possibility of theft.

The vehicle control apparatus according to the embodiment further comprises the normally-open valve (the bypass valve 35 or the pressure valves 36 and 37) that is disposed on the brake fluid path to the brake mechanisms at one side and the locking unit (the locking unit 50) that locks the normally-open valve to the closed state. In the brake control process, the fluid pressure applied state to the brake mechanisms at one side is kept by driving the locking unit to lock the normally-open valve in the closed state.

With the above configuration, even if the vehicle is powered off after the control to lock the wheels at one side is started or even if the thief powers off the vehicle in order to avoid the theft prevention control, the lock state of the wheels at one side is capable of being kept.

Accordingly, it is possible to improve the effect of preventing the theft.

In the vehicle control apparatus according to the embodiment, in the brake control process, which side of the wheels are to be locked is determined based on the outside environment recognition result of the vehicle.

With the above configuration, the wheels to be locked are capable of being determined so as to improve the safety based on the outside environment recognition result of the vehicle. For example, the wheels to be locked are determined so that the vehicle deviates in a direction that prevents a secondary disaster when the vehicle is deviated due to collision of another vehicle from behind.

Accordingly, it is possible to realize not only both the vehicle theft prevention and the securement of the portability of the vehicle to a safety place but also the securement of the safety after the vehicle is stopped as the control performed after the vehicle is stopped through the driver emergency control.

The vehicle control apparatus according to the embodiment further comprises the acceleration control unit (the engine control unit 12) that performs control to accelerate the vehicle based on the request torque, which is set based on the operation amount of the accelerator. In the brake control process, the control is performed so as to issue an instruction to accelerate the vehicle with the shift request torque to the acceleration control unit and so as to apply the brake fluid pressure for cancellation of the shift torque to the brake mechanism in response to an accelerator operation after the vehicle is stopped through the driver emergency control. The shift request torque is greater than the request torque corresponding to the accelerator operation by an amount corresponding to the shift torque.

With the above configuration, the control to enable the vehicle to run but to set the brake to the dragged state during running is capable of being performed if the vehicle is left in a state in which the key is left, that is, if the vehicle is left in a state in which driving by a third person, such as a thief, is available after the vehicle is stopped through the driver emergency control. Although the thief attempts to cancel the control if the thief has noticed that the brake control for theft prevention is activated, the vehicle is accelerated in response to the accelerator operation during the drag control and, thus, it is possible to make it difficult for the thief to notice the activation of the brake control. Since the drag control of the brake is continued while the vehicle is running, fading of the brake will occur and it makes difficult for the thief to drive and take away the vehicle. In other words, it is possible to reduce the motivation of the thief to take away the vehicle.

Accordingly, with the above configuration, it is possible to improve the difficulty for the thief to take away the vehicle if the vehicle is left in the state in which the key is left after the vehicle is stopped through the driver emergency control to improve the effect of preventing the theft.

The vehicle control apparatus 10 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle control apparatus 10 including the key system control unit 11, the engine control unit 12, the brake control unit 13, and the driving support control unit 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle control apparatus in a vehicle that comprises left wheels at a left side, right wheels at a right side and brake mechanisms each provided in the left wheels and the right wheels, the vehicle control apparatus comprising:
   one or more processors; and
   one or more storage media storing a program to be executed by the one or more processors,
   wherein the program comprises one or more instructions, and
   wherein the one or more instructions cause the one or more processors to perform a brake control process in which brake fluid pressure is applied to the brake mechanisms of one-side wheels that are either the left wheels or the right wheels to bring the one-side wheels to a locked state under a condition including that the vehicle is in a stopped state or in a substantially stopped state through driver emergency control, the driver emergency control being to be applied to the vehicle in response to detection of emergency of a driver who drives the vehicle.

2. The vehicle control apparatus according to claim 1, wherein, in the brake control process, the condition includes that a key of the vehicle is in a non-detection state after the vehicle is in the stopped state through the driver emergency control.

3. The vehicle control apparatus according to claim 1, further comprising:
   normally-open valves disposed on brake fluid paths to the brake mechanisms of the one-side wheels; and
   locking units configured to lock the normally-open valves to a closed state,
   wherein, in the brake control process, a fluid pressure applied state to the brake mechanisms of the one-side wheels is kept by driving the locking unit to lock the normally-open valves in the closed state.

4. The vehicle control apparatus according to claim 2, further comprising:
   normally-open valves disposed on brake fluid paths to the brake mechanisms of the one-side wheels; and
   locking units configured to lock the normally-open valves to a closed state,
   wherein, in the brake control process, a fluid pressure applied state to the brake mechanisms of the one-side wheels is kept by driving the locking unit to lock the normally-open valves in the closed state.

5. The vehicle control apparatus according to claim 1, wherein, in the brake control process, which of the left wheels and the right wheels are to be locked is determined based on a recognition result of outside environment of the vehicle.

6. The vehicle control apparatus according to claim 2, wherein, in the brake control process, which of the left wheels and the right wheels are to be locked is determined based on a recognition result of outside environment of the vehicle.

7. The vehicle control apparatus according to claim 3, wherein, in the brake control process, which of the left wheels and the right wheels are to be locked is determined based on a recognition result of outside environment of the vehicle.

8. The vehicle control apparatus according to claim 4, wherein, in the brake control process, which of the left wheels and the right wheels are to be locked is determined based on a recognition result of outside environment of the vehicle.

9. The vehicle control apparatus according to claim 1, further comprising:
   an acceleration control unit configured to perform control to accelerate the vehicle based on request torque, the request torque being set based on an operation amount of an accelerator of the vehicle,
   wherein, in the brake control process, control is performed so as to issue an instruction to accelerate the vehicle with shift request torque to the acceleration control unit and so as to apply brake fluid pressure for cancellation of shift torque to the brake mechanisms of the one-side wheels in response to operation of the accelerator after the vehicle is stopped through the driver emergency control, the shift request torque being greater than the request torque corresponding to the operation of the accelerator by an amount corresponding to the shift torque.

10. The vehicle control apparatus according to claim 2, further comprising:

an acceleration control unit configured to perform control to accelerate the vehicle based on request torque, the request torque being set based on an operation amount of an accelerator of the vehicle, wherein, in the brake control process, control is performed so as to issue an instruction to accelerate the vehicle with shift request torque to the acceleration control unit and so as to apply brake fluid pressure for cancellation of shift torque to the brake mechanisms of the one-side wheels in response to operation of the accelerator after the vehicle is stopped through the driver emergency control, the shift request torque being greater than the request torque corresponding to the operation of the accelerator by an amount corresponding to the shift torque.

11. The vehicle control apparatus according to claim 3, further comprising:

an acceleration control unit configured to perform control to accelerate the vehicle based on request torque, the request torque being set based on an operation amount of an accelerator of the vehicle, wherein, in the brake control process, control is performed so as to issue an instruction to accelerate the vehicle with shift request torque to the acceleration control unit and so as to apply brake fluid pressure for cancellation of shift torque to the brake mechanisms of the one-side wheels in response to operation of the accelerator after the vehicle is stopped through the driver emergency control, the shift request torque being greater than the request torque corresponding to the operation of the accelerator by an amount corresponding to the shift torque.

12. The vehicle control apparatus according to claim 4, further comprising:

an acceleration control unit configured to perform control to accelerate the vehicle based on request torque, the request torque being set based on an operation amount of an accelerator of the vehicle, wherein, in the brake control process, control is performed so as to issue an instruction to accelerate the vehicle with shift request torque to the acceleration control unit and so as to apply brake fluid pressure for cancellation of shift torque to the brake mechanisms of the one-side wheels in response to operation of the accelerator after the vehicle is stopped through the driver emergency control, the shift request torque being greater than the request torque corresponding to the operation of the accelerator by an amount corresponding to the shift torque.

13. The vehicle control apparatus according to claim 5, further comprising:

an acceleration control unit configured to perform control to accelerate the vehicle based on request torque, the request torque being set based on an operation amount of an accelerator of the vehicle, wherein, in the brake control process, control is performed so as to issue an instruction to accelerate the vehicle with shift request torque to the acceleration control unit and so as to apply brake fluid pressure for cancellation of shift torque to the brake mechanisms of the one-side wheels in response to operation of the accelerator after the vehicle is stopped through the driver emergency control, the shift request torque being greater than the request torque corresponding to the operation of the accelerator by an amount corresponding to the shift torque.

14. The vehicle control apparatus according to claim 6, further comprising:

an acceleration control unit configured to perform control to accelerate the vehicle based on request torque, the request torque being set based on an operation amount of an accelerator of the vehicle, wherein, in the brake control process, control is performed so as to issue an instruction to accelerate the vehicle with shift request torque to the acceleration control unit and so as to apply brake fluid pressure for cancellation of shift torque to the brake mechanisms of the one-side wheels in response to operation of the accelerator after the vehicle is stopped through the driver emergency control, the shift request torque being greater than the request torque corresponding to the operation of the accelerator by an amount corresponding to the shift torque.

15. The vehicle control apparatus according to claim 7, further comprising:

an acceleration control unit configured to perform control to accelerate the vehicle based on request torque, the request torque being set based on an operation amount of an accelerator of the vehicle, wherein, in the brake control process, control is performed so as to issue an instruction to accelerate the vehicle with shift request torque to the acceleration control unit and so as to apply brake fluid pressure for cancellation of shift torque to the brake mechanisms of the one-side wheels in response to operation of the accelerator after the vehicle is stopped through the driver emergency control, the shift request torque being greater than the request torque corresponding to the operation of the accelerator by an amount corresponding to the shift torque.

16. The vehicle control apparatus according to claim 8, further comprising:

an acceleration control unit configured to perform control to accelerate the vehicle based on request torque, the request torque being set based on an operation amount of an accelerator of the vehicle, wherein, in the brake control process, control is performed so as to issue an instruction to accelerate the vehicle with shift request torque to the acceleration control unit and so as to apply brake fluid pressure for cancellation of shift torque to the brake mechanisms of the one-side wheels in response to operation of the accelerator after the vehicle is stopped through the driver emergency control, the shift request torque being greater than the request torque corresponding to the operation of the accelerator by an amount corresponding to the shift torque.

* * * * *